(12) United States Patent
Le Cam

(10) Patent No.: US 9,329,083 B2
(45) Date of Patent: May 3, 2016

(54) MOBILE APPARATUS FOR CHECKING AIRPORT MARKER LIGHTS

(75) Inventor: Lionel Le Cam, Verrières le Buisson (FR)

(73) Assignee: FB TECHNOLOGY, Evry (FR)

( * ) Notice: Subject to any disclaimer, the term of this patent is extended or adjusted under 35 U.S.C. 154(b) by 0 days.

(21) Appl. No.: 14/344,845

(22) PCT Filed: Sep. 13, 2012

(86) PCT No.: PCT/EP2012/068011
§ 371 (c)(1),
(2), (4) Date: Feb. 10, 2015

(87) PCT Pub. No.: WO2013/037921
PCT Pub. Date: Mar. 21, 2013

(65) Prior Publication Data
US 2015/0146197 A1    May 28, 2015

(30) Foreign Application Priority Data

Sep. 13, 2011    (FR) ...................................... 11 58165

(51) Int. Cl.
*G01J 1/42*    (2006.01)
*G01J 1/02*    (2006.01)
(Continued)

(52) U.S. Cl.
CPC ... *G01J 1/42* (2013.01); *B64F 1/20* (2013.01); *G01J 1/02* (2013.01); *G01J 1/0242* (2013.01); *G01J 1/0271* (2013.01); *G01J 3/505* (2013.01);
(Continued)

(58) Field of Classification Search
CPC ........... G01J 1/42; G01J 1/0271; G01J 3/505; B64F 1/20; F21W 2111/06
USPC ........... 356/213–236; 348/187, 175; 364/439, 364/461
See application file for complete search history.

(56) References Cited

U.S. PATENT DOCUMENTS

| 5,519,618 A | * | 5/1996 | Kastner et al. ................ 701/120 |
| 2003/0093187 A1 | * | 5/2003 | Walker ............................. 701/1 |

(Continued)

FOREIGN PATENT DOCUMENTS

| EP | 1366989 A1 | 12/2003 |
| GB | 1454272 A | 11/1976 |

OTHER PUBLICATIONS

French Search Report and Written Opinion dated Apr. 2, 2012 for corresponding French Application No. 1158165, filed Sep. 13, 2011.
(Continued)

*Primary Examiner* — Sang Nguyen
(74) *Attorney, Agent, or Firm* — David D. Brush; Westman, Champlin & Koehler, P.A.

(57) ABSTRACT

A mobile apparatus is provided for measuring photometric characteristics of airport marker lights. The mobile apparatus includes a measuring rod configured to be moved above the marker lights to be checked, in light beams emitted by these marker lights, and a device for measuring the distance between the measuring rod and the marker lights to be checked. The measuring rod carries at least one photometric sensor and includes a device for acquiring and processing the signals emitted by the photometric sensor or sensors during its movement, as a function of the distance measured between the measuring rod and the marker lights to be checked. The device for acquisition and processing is configured to generate a set of data representing photometric characteristics of each marker light checked.

14 Claims, 3 Drawing Sheets

(51) Int. Cl.
  *B64F 1/20* (2006.01)
  *G01J 3/50* (2006.01)
  *F21W 111/06* (2006.01)

(52) U.S. Cl.
  CPC ..... *F21W 2111/06* (2013.01); *G01J 2001/4247* (2013.01)

(56) References Cited

U.S. PATENT DOCUMENTS

2008/0036866 A1* 2/2008 Sogawa et al. ............... 348/187
2008/0181488 A1* 7/2008 Ishii et al. ................... 382/154
2009/0177426 A1* 7/2009 Dodds et al. ................ 702/85
2012/0033087 A1* 2/2012 Takeda et al. ............... 348/187

OTHER PUBLICATIONS

International Preliminary Report on Patentability and English translation of the Written Opinion dated Mar. 18, 2014 for corresponding International Application No. PCT/EP2012/068011, filed Sep. 13, 2012.

International Search Report dated Oct. 1, 2012 for corresponding International Application No. PCT/EP2012/068011, filed Sep. 13, 2012.

* cited by examiner

12
MOBILE APPARATUS FOR CHECKING AIRPORT MARKER LIGHTS

1. CROSS-REFERENCE TO RELATED APPLICATIONS

This application is a Section 371 National Stage Application of International Application No. PCT/EP2012/068011, filed Sep. 13, 2012, which is incorporated by reference in its entirety and published as WO 2013/037921 on Mar. 21, 2013, not in English.

2. FIELD OF THE INVENTION

The present invention pertains to the checking of airport marker lights. More specifically, the present invention pertains to a mobile apparatus for measuring the photometric characteristics of these marker lights.

3. PRIOR ART

Airport platforms are equipped with marker lights that are visual aids needed for the efficient running of the aircraft landing, take-off and taxiing phases. These marker lights make for the safety of the individuals in the aircraft, including and above all in conditions of poor visibility. They must comply with standards laid down by the International Civil Aviation Organization (ICAO) that stipulate firstly the minimum technical performances and secondly the conditions of maintenance of these marker lights. This performance and these conditions of maintenance are defined differently depending on the function of the marker light on the airport site. These functions are, for example, the runway axis function marking out the runway axis, or the "touchdown zone" function marking out the position on the runway where the aircraft are to touch down, etc.

Thus, the ICAO requires that the photometric characteristics of these marker lights, and especially, the average intensity in their main beam, their beam spread and their vertical settings and azimuth settings should be regularly checked. Indeed, the luminous intensity of a marker light must be always greater than 50% of the nominal value specified by the ICAO and the beam spreads of the light beams emitted by the marker light should always be greater than the limits specified. Similarly, the beam setting must correspond to the ICAO standard defined for the function measured.

The ICAO also imposes the photometric checking of the marker lights. The frequency of checking, which cannot be less than twice a year for inset marker lights and once a year for the other lights, can be higher for certain airport platforms because of their air traffic or environment conditions (pollution, dust, salt air, etc).

Besides, the ICAO or the national authorities can impose sentences of restriction of use or loss of use to airport platforms in which there is an excessively high proportion of marker lights declared to be out of service, i.e. marker lights for which average intensity of the main light beam is lower than 50% of the rated value. Similarly, the fact that two adjacent lights on a runway axis are declared to be out of service automatically leads to the suspension of the authorization for receiving aircraft in the airport platform during periods of low visibility.

The document GB 1 454 272 describes a mobile apparatus for marker lights that can be placed in the rear of a vehicle. This apparatus has several photometric sensors positioned vertically. The apparatus is moved above a marker light. After being moved away from this light by a predetermined distance, it records the measurements made by the sensors.

Due to the vertical distribution of its sensors, this apparatus can only be used to measure some of the characteristics of the light beam. It is thus unable to measure either the beam spread or the azimuth setting. Furthermore, the small number of measurements allowed by this apparatus (six measurements per marker light) gives only very rough measurements of the characteristics of the marker light. Besides, the measured values are highly dependent on the accuracy of the alignment of the sensors on the light beam at the time of the measurement. Finally, given the shape of the apparatus, it can only be used to check the runaway center line lights, above which it is possible to move, but not the edge lights, that are generally raised.

The document EP 1 366 989 also describes another mobile apparatus for marker lights in which the light beam is received by a vertical screen. Here again, the apparatus is moved above a marker light. After the apparatus is moved to a predetermined distance from this marker light, sensors measure the light received by the screen. If the screen, at this distance, receives in a normal way the light corresponding to the entire beam, then the number of measurements made for each light is equal to the number of sensors used. Such an apparatus therefore contains numerous sensors and is therefore costly. Besides this, the number of measurements made for each marker light remains nevertheless relatively limited, and does not enable a sufficiently precise measurement of the characteristics of the light. Finally, this apparatus is relatively bulky and awkward to use for the checking of raised lights. To meet the needs of photometric checking of marker lights for airport platforms, the Applicant has developed a mobile apparatus for measuring photometric characteristics that is reliable, precise and simple to use. This mobile checking apparatus or measuring apparatus enables to measure precisely the characteristics of the runway and taxiway marker lights of airport platforms and to provide information to help in the maintenance of these marker lights.

This prior-art measuring device is represented schematically in FIG. 1. It comprises mainly a measuring rod 1 carried by a motor vehicle 2 or a trailer, a device configured for measuring the distance between the rod and the measured marker lights and a computer device placed in the motor vehicle 2 or on the trailer vehicle.

The measuring rod 1, which is constituted by a metal casing, carries a plurality of photometric sensors distributed on its length as shown in greater details in FIG. 2. It must be moved above each of the marker lights 3 to be checked and can thus measure the intensity of the light beam sent out by the marker light while it approaches this light. It is possible thereafter to compute the intensity, the aperture and the setting of these beams while the measuring rod is being moved above the lights 3 at speeds of up to 80 km/h. Here below in the description, the faces of the measuring rods that are to be oriented forward, rearward and downward during the normal movement of the vehicle carrying these rods will be designated respectively as "front face", "rear face" and "lower face".

To enable an accurate measurement of the characteristics of the marker lights 3, the measuring rod 1 shown in FIG. 2 classically comprises:

three photometric sensors—called measurement sensors—11 directed forwards and aligned in a horizontal direction, that are distributed on the front face of the rod;

two photometric sensors—called color or colorimetric sensors—12 on the front face of the rod and directed forwards, each equipped with a different color filter so as to identify the color of the light (in certain configurations, these color sensors can be replaced by a spectrophotometer capable of giving the chromatic characteristics of the light measured);

eleven photometric sensors called light detection sensors on the lower face of the rod and pointed downwards (not visible in the figures) that are to detect the instant at which the measuring rod 1 passes above the marker light 3;

a camera 13 transmitting an image to a video monitor 130 situated in front of the driver of the vehicle 2 in order to enable him to easily drive the vehicle along a path enabling an accurate measurement.

Each of the photometric sensors permanently sends out an analog signal corresponding to the values of the luminous flux received per unit of surface area (measured in lux) in the beam measured. However, since the ICAO standard defines the luminous intensity of the beams in candela, it is necessary to know the distance between the sensors and the light measured.

To this end, some device for measuring the movement of the vehicle enable the computation of the distance between the measured light 3 and the rod 1 where the values of luminous flux (in lux) are measured and memorized, enabling the conversion of the measurement into candela. These measuring means, which are known per se, can for example be constituted by a measuring wheel, that runs on the ground. The number of revolutions that it makes is then counted.

In the embodiment shown in FIG. 1, the device for measuring is constituted by a Doppler radar 18 which permanently measures the speed of movement of the vehicle. When the measuring rod 1 passes above the light 3, the light detection sensors send a signal corresponding to this passage. A computation based on the previously measured speeds of movement then makes it possible to deduce the distance between the rod and the marker light during the previously performed measurements of luminous flux. These measurements of luminous flux can then be associated with corresponding distances to compute the luminous intensity of the marker light.

Thus, the measurements of luminous intensity of the marker light are not measured at a given distance from the marker light as provided for in the documents GB 1 454 272 or EP 1 366 989, but continuously or almost continuously as the measuring rod approaches the marker light. This method therefore enables a very precise measurement of the characteristics of the marker light. However, the measurements made generate a great quantity of data to be processed, a quantity far greater than the data generated by the apparatuses of the documents GB 1 454 272 or EP 1 366 989.

The signals emitted by the photometric sensors are transmitted by a system of cables 14 to an interface unit 15 situated in the vehicle 2, which enables the processing of all the signals and their transmission to a computer 16 also situated in the vehicle 2. This computer is connected to a touch screen 17 by which an operator sitting in the vehicle can control the operation of checking the marker lights. Similarly, the signals sent out by the device for measuring movement, or more specifically the Doppler radar 18, are transmitted to the interface unit 15 by a system of cables 181.

Finally, a geolocation receiver 19, for example using the GPS (Global Positioning System) standard, can also be connected to the computer 16. This GPS receiver gives the location (latitude and longitude) of each of the marker lights measured and enables the photometric characteristics of a light to be associated with its coordinates, thereafter enabling them to be associated with the marker light having the same coordinates in the airport database. This geolocation receiver is optional and is not strictly needed for the use of the mobile measuring apparatus. However, it can advantageously be used to obtain statistics on the performance of the lights or to more easily guide operators towards places where maintenance operations have to be performed.

The installation of the measuring rod 1 on a vehicle 2 can be done relatively quickly, within about 10 minutes, when the vehicle 2 is equipped with an appropriate support structure. However, this installation requires the connection of a large number of cables especially connecting the measuring rod 1 with the interface pack 15 situated in the vehicle.

Thus, the connection between the measuring rod 1 and the interface pack 15 must be done by a multi-strand cable comprising 62 wires and therefore implies that there is a connection of connectors comprising 62 connection points which are particularly brittle and whose reliability is especially lower as the mobile measuring apparatus may have to be frequently disconnected and reconnected.

In addition, this multistrand cable can be subjected, between the measuring rod 1 and the interface pack 15, to electromagnetic disturbances caused by the different instruments and apparatuses present on the airport platform. These electromagnetic disturbances can generate interference falsifying the measurements of luminosity of the signalling lights. The use of a sheathed cable enables this interference to be limited normally without however totally eliminating it. Besides, each of the elements of the measuring device has to be powered with electricity. The photometric sensors and the distance measuring sensor can be powered directly with 12V DC voltage given by the battery of the vehicle. The interface box and the computer have to be powered with 220 V AC current which must be given by an appropriate converter.

Thus, since a large number of connectors and cables have to be connected, the installation of the checking device on the vehicle requires numerous operations which may lead to wrong installation through the overlooking of a connection and through poor contact in a connector. These numerous connections then reduce the reliability of the mobile measuring apparatus.

Besides, it can happen that the computer assigned to the processing of data is slowed down or blocked by a computer error, which then does not enable real-time processing of all the data coming from the sensors. Such random events therefore require the repetition of a series of measurements.

It must be noted that the problems related to the transfer and processing of data, which arise for this prior-art measuring rod, do not arise for the measuring equipment of the documents GB 1 454 272 or EP 1 366 989. Indeed, since the measurements of the characteristics of a marker light made by these apparatuses are less precise, the quantity of data to be processed is far smaller.

Finally, since many lights are two-way lights, checking them requires the vehicle to make two passages in different directions above the lights. Since an airport platform runway generally comprises several alignments of lights, the checking of all these marker lights requires that the vehicle carrying the measuring rod should make two passages. This makes it difficult to carry out measurements since the use of these runways for aircraft take-off, landing and taxiing is of course a priority.

4. SUMMARY OF THE INVENTION

These goals as well as others that shall appear more clearly here below are achieved by means of a mobile apparatus for measuring the photometric characteristics of airport marker lights, the mobile apparatus comprising a measuring rod designed to be moved above the marker lights to be checked, in the light beams emitted by these marker lights, and means for measuring the distance between said measuring rod and the marker lights to be checked, said measuring rod carrying at least one photometric sensor. According to the invention, said measuring rod comprises means for acquiring and processing the signals emitted by said photometric sensor or sensors during its movement, as a function of the distance measured between said measuring rod and the marker lights to be checked, said means of acquisition and processing being capable of generating a set of data representing photometric characteristics of each marker light checked.

Thus, in these measurement apparatuses, the photometric sensors do not measure the light emitted by the marker light at given distance from the marker light but during the movement of the rod in the light beam emitted by the marker light. During this movement, several measurements are therefore made by the photometric sensors. Preferably, these measurements are continuous or almost continuous during a certain time interval in order to obtain a very precise measurement of the photometric characteristics of the marker light.

The generation of a set of data representing the photometric characteristics of each marker light checked by the means of acquisition and processing is therefore done from the signals emitted by said photometric sensor or sensors at several different instants, each corresponding to different distances between the rod and the marker light.

Since the signals are processed is done in the rod, it is no longer necessary to send the very many signals emitted by the sensors to a computer situated in the vehicle, outside the rod. The space requirement entailed in installing the computer in the vehicle is done away with and the connection system between the vehicle and the rod, which preferably has means for fixed attachment to the vehicle, is thus simplified. This makes the installation on the vehicle of the mobile apparatus for checking marker lights easier, faster and more reliable than in the prior art.

Thus, a mobile checking apparatus according to the invention takes up less space, and is more reliable and more efficient than in the prior art. Advantageously, said measuring rod constitutes a Faraday cage protecting said sensors and/or said means of acquisition and processing against electromagnetic radiation.

Thus, the processing in the rod itself, which is a casing preferably made of metal, of the analog signals generated by the sensors makes the measurements less sensitive to electromagnetic disturbances.

Preferably, said set of data representing the photometric characteristics of each checked marker light is a digital signal.

A digital signal of this kind, which is preferably a binary signal, is less sensitive to electromagnetic disturbances than an analog signal.

Advantageously, said measuring rod carries means for transmitting said set of data to a computer enabling the recording of said sets of data and/or to the interface with a user.

Unlike in the prior art, this computer does not have a function of acquiring data. It can advantageously be a touch tablet which is an interface that is particularly easy to use by the operator situated in the vehicle.

According to one preferred embodiment, said means of transmission are means of radio transmission.

Thus, the connection systems between the rod and the computer enabling the recording of said sets of data and/or interface with a user are eliminated, making even easier the installation of the mobile checking equipment in the vehicle.

Advantageously, said radio sending means are constituted by a radio transmitter complying with a WiFi (registered mark) standard.

Such a radio transmitter enables easy linkage with the computer, which can be situated in the vehicle or anywhere on the airport platform, depending on the range of the radio transmission considered.

Preferably, said measuring rod comprises a plurality of frontward oriented photometric sensors.

This rod thus enables the measurement of photometric characteristics of a marker light while it approaches this marker light in its light beam and before passing above the marker light.

This method of forward measurement enables the operator present in the vehicle to complement the checking of the marker lights by visual checking performed under conditions close to those of pilots or runway controllers moving on the runways. Besides, when the checking of the marker lights is done on a wet runway, the frontward measurement of the photometric characteristics prevents disturbances due to the spray of splashing water that forms behind the vehicle.

According to one particular embodiment of the invention, said measuring rod furthermore comprises a plurality of rearward-oriented photometric sensors.

Thus, in a single passage, the rod can measure the characteristics of marker lights illuminating the direction opposite to its movement and the direction of its movement. It thus enables the performance of a greater number of measurements with a limited number of passages on the runway. Thus, a rod of this kind minimizes the time during which the runway is made unusable for the aircraft. These measurements are preferably made by means of distinct photometric sensors but by using data from the same means for measuring the distance between the measuring rod and the marker lights to be checked.

Advantageously, said measuring rod comprises at least one photometric sensor for detecting downward-oriented marker lights.

This marker light detection sensor can be used to very precisely determine the position of the marker lights to be checked when the mobile checking apparatus passes above the marker lights.

Preferably, said means for measuring the distance between said measuring rod and the lights to be checked include said photometric sensor for detecting marker lights and means for measuring the speed of movement of said measuring rod.

The combination of the marker light detection sensors and the means for measuring speed enable a very precise computation of the distance between the marker light and the rod at each instant. The precise determination of this distance is indispensable to determine whether the photometric characteristics of the marker lights comply with prevailing standards. It must be noted that these means for measuring the distance between the measuring rod and the marker lights cannot be replaced by a geolocation device, for example of the GPS type. Indeed, these geolocation devices do not give sufficient precision of measurement to enable the precise computation of the photometric characteristics of the marker lights.

Advantageously, said measuring rod comprises means for colorimetric analysis of the marker lights checked.

Advantageously, said means of processing are constituted by an industrial programmable automaton placed in said measuring rod.

According to one advantageous embodiment, the mobile checking apparatus comprises a geolocation receiver enabling each set of data representing the photometric characteristics of a marker light to be associated with the relocation coordinates of this marker light.

Such geolocation receivers are not indispensable and cannot replace the means for measuring the distance between the measuring rod and the marker lights. However, they can advantageously enable the identification of the lights measured by comparing their coordinates with those recorded in a database, and can be used to guide the vehicle carrying the mobile checking apparatus towards the marker lights to be checked.

Preferably, said measuring rod comprises a plurality of photometric sensors placed in a same substantially horizontal plane. This layout of the sensors enables the rod to extend essentially in a horizontal direction. It is thus easy to associate this rod with a vehicle, especially by fixing it to the vehicle by one of its ends, in such a way that it is held so as to be overhanging beside the vehicle. This layout enables the easier measurement of the characteristics of raised marker lights.

5. LIST OF FIGURES

Other features and advantages of the invention shall appear from the following description of preferred embodiments given by way of simple illustrative and non-exhaustive examples and from the appended figures, of which:

FIGS. 1 and 2 which have been commented upon here above are schematic representations respectively of a vehicle equipped with a mobile apparatus for checking marker lights according to a prior art, and of the measurement bar of this apparatus of the prior art;

6. DESCRIPTION OF EMBODIMENTS

Improved Data Transmission

Figure 3:
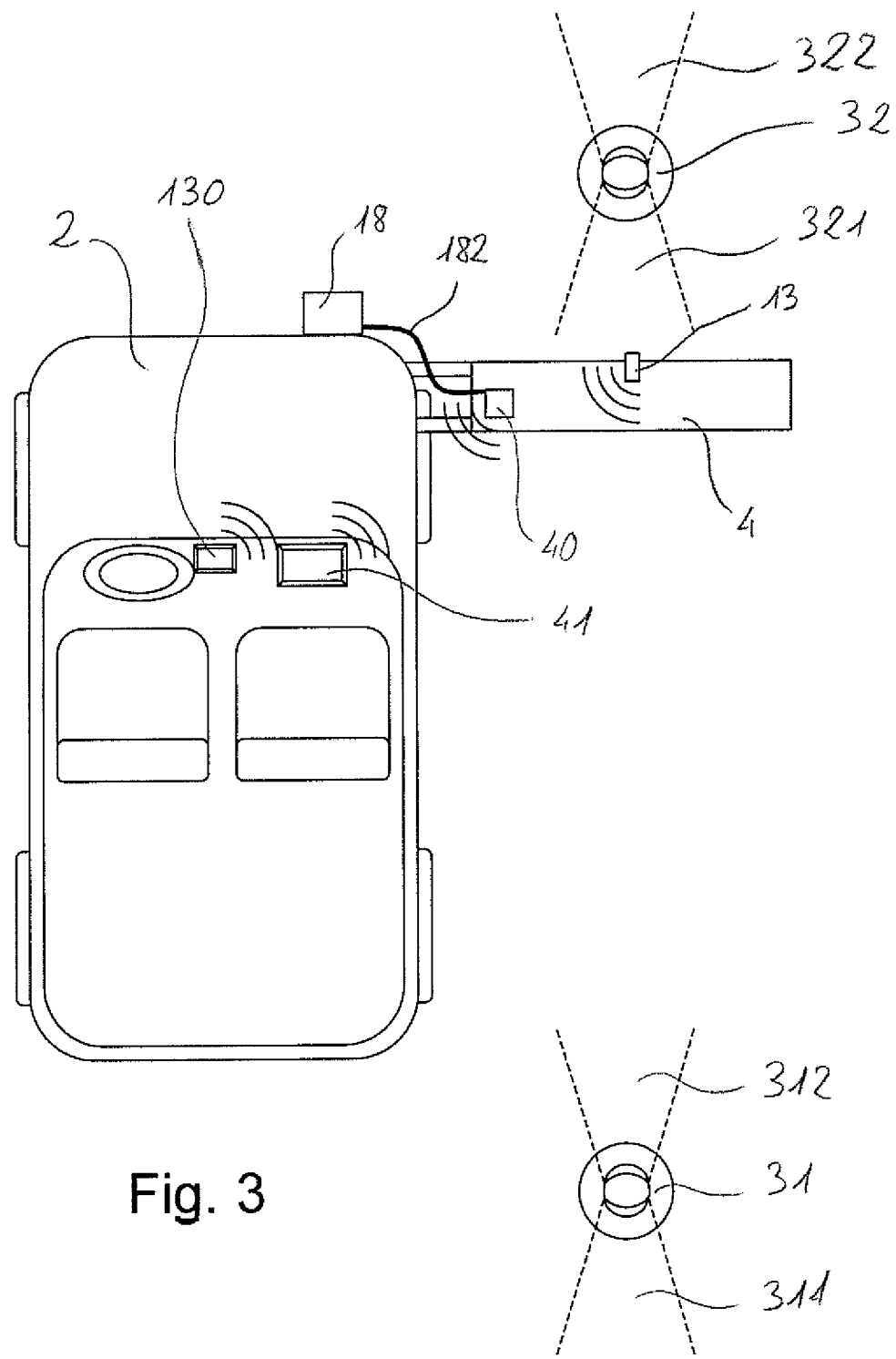
FIG. 3 is a schematic representation of a vehicle equipped with an apparatus for checking marker lights according to a first embodiment of the invention.

FIG. 3 is a schematic view of a vehicle 2 equipped with an apparatus for checking marker lights according to a first embodiment of the invention. This checking apparatus comprises a measuring rod 4 and a Doppler radar 18 carried by the vehicle 2. The measuring rod 4 comprises a casing, preferably made of metal, to form a Faraday cage. It is represented schematically in a top view in FIG. 4 without its upper face (lid) so that the elements placed inside this casing are visible.

Like the prior art measuring rod, the front face of the measuring rod 4 comprises a plurality of photometric sensors 11 (measurement sensors) placed in a horizontal line, photometric sensors 12 equipped with color filters (color sensors) to determine the colorimetric characteristics of the marker lights and identify the color of the beam, and a camera 13 enabling the driver of the vehicle 2 to easily follow the best path for checking the marker lights.

It must be noted that, according to one possible variant, the correct path can be maintained by using existing systems for assistance in the guidance and driving of vehicles.

It must also be noted that, according to another possible variant, the color sensor can be constituted by a spectra-colorimeter module giving the chromatic coordinates of the beam of the marker light.

The rod 4 also has a plurality of photometric sensors 10 called marker light detection sensors, which are carried on the lower face of the rod and are directed downwards. These detection sensors can be used to determine the instant at which the rod 4 passes above a marker light.

While the rod 4 approaches the marker light to be checked, the frontward-oriented measuring sensors 10 are illuminated by the light beam. They then continuously measure the illumination that they receive. The illumination that they receive undergoes changes during the movement of the rod in the light beam emitted by the marker light.

The changes in the illumination of these sensors while the marker light is being approached can be used to deduce the photometric characteristics being sought, if the distance of the marker light is known for each measurement. This distance is known with precision only after the passage of the rod above the marker light, through the detection sensor 10 and a device configured for measuring the distance between the rod and the measured marker light.

Each of the photometric sensors carried by this measuring rod 4 during this movement emits an analog signal by means of connection cables connected to an interface module 42. These interface modules 42, which can each be connected to four sensors, provide the electrical power supply of these sensors and convert their analog signal into a binary signal which they transmit by means of a network cable to a programmable industrial automaton 40 which is placed in a tightly-sealed compartment 43 at one end of the rod 4. Besides, the Doppler radar 18 is also connected to this industrial programmable automaton 40 by means of a cable 182.

While the transmitted binary signal is not continuous like the analog signal emitted by the sensors during the movement, it is nevertheless almost continuous. Thus, the industrial programmable automaton 40 preferably receives a measurement from each of the sensors whenever the rod has travelled a distance of about two centimeters. Thus, the measurement by the sensors is done during the movement of the rod, i.e. at several instants during its movement and not at a given instant during this movement.

This automaton 40 is programmed to process all the data coming from the photometric sensors 10 and 11 and the Doppler radar in order to generate a set of data representing characteristics of each marker light measured. The generating of a set of data representing photometric characteristics of each marker light checked by the device acquisition and processing is therefore done on the basis of the signals emitted by said photometric sensor or sensors at several different instants (and preferably at a large number of different instants), each corresponding to different distances between the rod and the marker light. These sets of data which are preferably in digital form are then transmitted from the automaton towards a checking and monitoring computer, which for example can be a touch tablet 41 type of device that is handled by an operator situated in the vehicle or in proximity to this vehicle.

According to a preferred solution, the industrial automaton 40 comprises a radio communications module, preferably according to the WiFi (registered mark) standard, enabling the transmission of sets of data, representing characteristics of marker lights, to the computer 41. Thus, it is no longer necessary to connect a cable between the computer 41 and the automaton 40. According to one possible variant, the link between the automaton 40 and the computer 40 can also be provided by a network communications type of cable.

This computer 41 therefore does not have a function of processing the analog type signals given by the different sensors. It only has the function of recording the payload information concerning the marker lights derived from the processing of the signals of the sensors by the industrial automaton 40 and enabling access to this information by the operator through its input/output interfaces, by means of a dedicated software program.

The presence in the rod 4 of the industrial automaton 40 which carries out the acquisition and processing of analog data coming from photometrical sensors very greatly limits the impact of electromagnetic disturbances on the measurements. Indeed, the casing of the rod 4 forms a Faraday cage efficiently protecting the sensors, the connection cables, the interface modules 42 and the automaton 40 against electromagnetic disturbances. After the processing by the automaton 40, the sets of data representing characteristics of the marker lights, which are transmitted to the computer, are in digital and not analog form. This makes them far less sensitive to electromagnetic disturbances.

Besides, each of the elements implemented in this checking apparatus is designed to be powered by a 12V or 24V DC voltage. This power supply can therefore be achieved easily, either directly by the electric circuit of the vehicle or by means of a single protected converter module.

It must be noted that, in the particular case of the alignments of the marker lights laid out through a runway or a taxiway (perpendicularly to the axis of the runway or taxiway) and illuminating the axis of the runway or taxiway, the checking can be done by following another method: the rod is carried vertically by the vehicle, its photometric sensors pointing towards the marker lights to be measured. It is moved by the vehicle parallel to the alignment of the marker lights (and therefore perpendicularly to the axis of the runway or taxiway), at a given distance from these marker lights. This method of checking, which concerns only a small proportion of the marker lights of an airport platform, is made possible by the use of the rod which can easily be assembled on the vehicle in the appropriate position, its photometric sensors pointing in the desired direction.

If it is necessary to use a geolocation receiver, for example compliant with the GPS (Global Positioning System), this receiver can be carried by the rod 4 and connected to the automaton 40 by means of the series port, a port compliant with by the USB (Universal Serial Bus) standard or a radio link (for example according to a Bluetooth or WiFi type standard). In this case, the geolocation information gathered, especially when the detection sensors detect the position of a marker light in order to identify this marker light with precision, can be included in the set of data representing characteristics of the marker lights sent by the automaton 40 to the computer 41.

In another possible embodiment, the geolocation receiver can be directly connected to the computer 41. In this case, the computer can record the geolocation data when it receives the single signal sent out by the automaton in order to associate the coordinates of the marker light checked with this signal.

The camera 13, according to the embodiment shown, is not connected to the automaton 40 but comprises its own radio sending means enabling it to send to video receiver 130 situated in the field of vision of the driver of the vehicle 13. As an alternative, the camera 13 can be connected by a cable to the video receiver 130.

Figure 4:
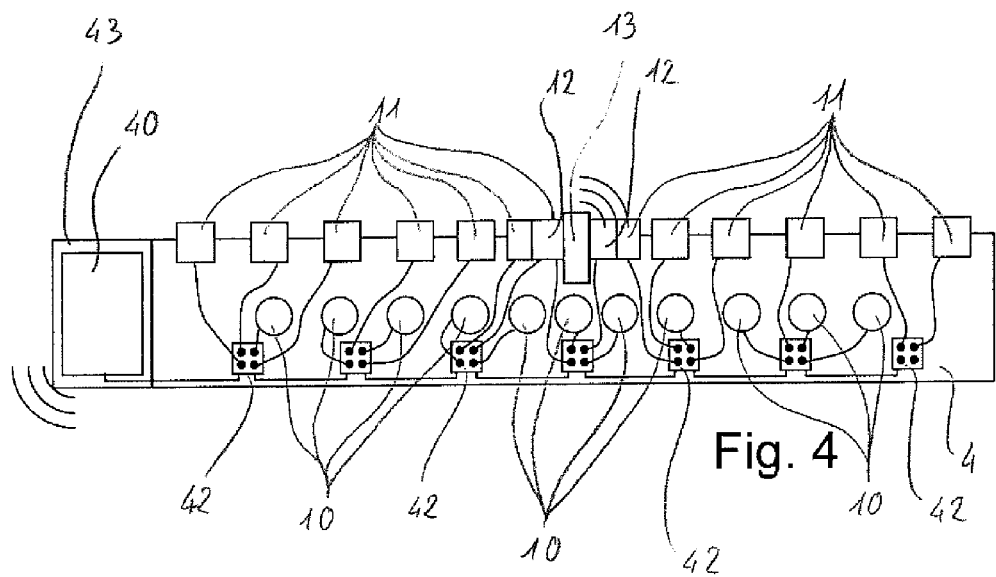
FIG. 4 is a schematic top view of the measuring rod of the checking apparatus of FIG. 3.

The mobile apparatus for checking the marker lights represented by FIGS. 3 and 4 thus shows numerous advantages as compared with the prior-art checking apparatus. It indeed enables an appreciable reduction in the number of cables in the equipped vehicle 2 and therefore a very substantial reduction of the number of connections to be made for installing the apparatus in the vehicle. This reduction of the number of connections significantly reduces the risks of connection error or false contacts. Besides, it reduces the sensitivity of the measuring apparatus to electromagnetic disturbances.

Two-Way Checking of Marker Lights

Figure 5:
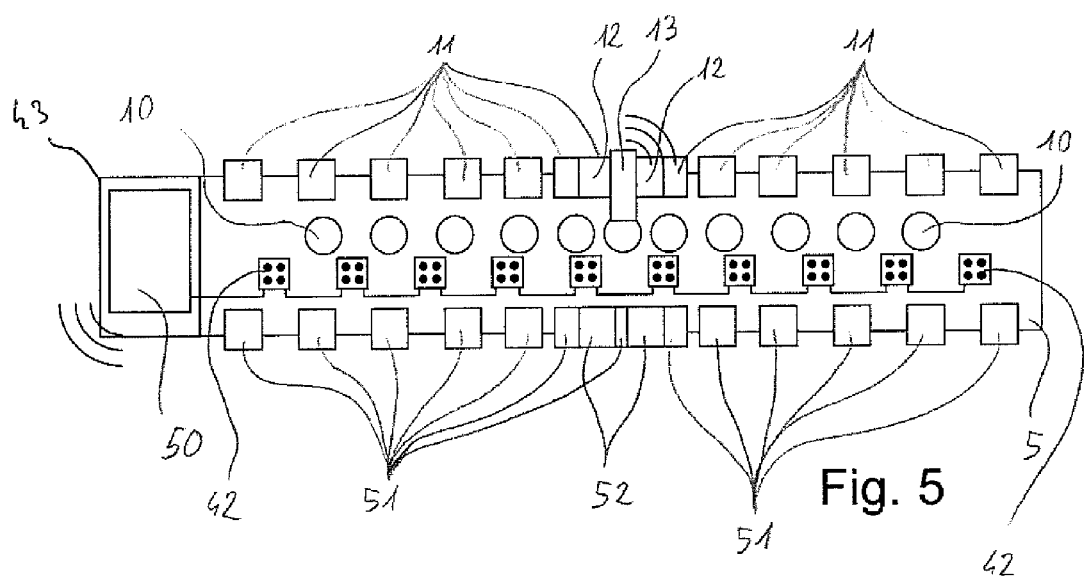
FIG. 5 is a schematic top view of a measuring rod according to another embodiment of the invention, capable of being implemented in checking apparatuses of FIG. 3 as a replacement for the rod of FIG. 4.

In a second possible embodiment of the invention, the rod 4 can be replaced in the apparatus for checking the marker lights represented in FIG. 3 by a measuring rod 5 such as the one shown in FIG. 5. This rod 5 has also a casing, preferably a metal casing, to form a Faraday cage. It is represented schematically in a top view without its upper face (lid) so that the elements placed inside the casing can be seen.

As in the rod 4 of FIG. 4 and the prior art measuring rod 1, the front face of the measuring rod 5 has a plurality of photometric sensors 11 placed along a horizontal line, photometric sensors 12 equipped with colored filters to determine the colorimetrical characteristics of the marker lights, and a camera 13 enabling the driver of the vehicle 2 to easily follow the best path to check the marker lights. It must be noted that, according to one possible variant, the color sensors can be constituted by a spectro-colorimetrical module giving the chromatic coordinates of the beam of the marker light.

The rod 5 also has photometrical sensors for detecting lights 10 and directed downwards to determine the instant at which the rod passes above a marker light.

The measuring rod 5 also has, on its rear face, a plurality of photometrical sensors 51 placed along a horizontal line and photometrical sensors 52 equipped with colored filters to determine the colorimetrical characteristics of the marker lights.

Through the photometrical sensors placed on its front and rear faces, the measuring rod 5 enables the measurement in a single passage, above a series of marker lights, of the photometrical characteristics of the beams emitted by these marker lights in the direction opposite the direction of movement of the rod 5 and in same direction as the direction of movement of this rod 5.

Thus, in the situation represented in FIG. 3, the mobile apparatus for checking is moved by the vehicle 2 so as to check a series of two marker lights 31 and 32 which each send a first light beam, 311 and 321 respectively, in the direction opposite to the direction of movement of the vehicle 2 and a second light beam, respectively 312 and 322, in the direction of movement of the vehicle 2.

When, as shown in FIG. 3, the measuring rod approaches the marker light 32, the sensors situated on its front face enable the measurement of the light flux of the beam 321 which this marker light 32 sends out in the direction opposite to the direction of movement of the rod. Subsequently when the rod passes above these marker lights 32, the marker light detection sensors detect this passage. Thus, they make possible, through the use of the information on speed of movement, to associate the measurements of luminous flux obtained during the approach, with the distance between the sensors and the marker lights 32, in order to deduce the luminous intensity of the marker light therefrom.

When a measuring rod 5 of the type shown in FIG. 5 is used, the sensors situated on its rear face also enable measurement of the photometric characteristics of the beam 312, that a marker light 31 sends in the direction of movement of the rod, while the measuring rod moves away from the marker light 31 after having passed above it. In this case, since the marker light detection sensors have detected the passage of the rod above the marker light 31, it becomes possible, by using the information on speed of movement, to associate the luminous flux measurements, which are subsequently obtained when the rod continues to move, with a distance between the sensors and the marker light 31, to deduce therefrom the luminous intensity of the marker light.

The use of the rod 5 comprising one set of frontward-oriented sensors and one set of rearward oriented sensors enables the checking, in a single passage, of both beams emitted by the two-way marker lights. This rod therefore makes it possible to halve the number of journeys on the runway by the vehicle by half for an exhaustive checking of the marker lights. This appreciably reduces the time during which the use of the runway has to be interrupted for checks.

Besides, the implementing in the rod of a second set of sensors can be done by using a single group of marker light detection sensors, a single device for measuring distance between the rod and the marker light and possibly a single geolocation apparatus, the information given by these apparatuses being used, as the case may be, to determine photometric characteristics of the marker lights situated before the rod and marker lights situated behind the rod.

For the sake of clarity, the connections of the different sensors implemented in the rod 5 with the interface modules 42 are not shown in FIG. 5. These sensors, in this embodiment, are connected by means of interface modules 42 to a programmable industrial automaton 40 placed in a tightly-sealed compartment 43 at one end of the rod. This programmable industrial automaton 40, as in the embodiment shown in FIG. 4, processes all the data coming from the different photometric sensors and the distance measurement sensor in order to generate a set of data representing the characteristics of each beam checked. This industrial automaton 40 also has a radio communications module, preferably according to the WiFi (registered mark) standard, enabling the transmission of the single signal towards an appropriate computer (alternatively a network communications type of cable can connect the automaton and the computer).

The embodiment shown in FIG. 5, in which the measuring rod comprises a device for acquisition and processing signals sent by the photometric sensors oriented frontward and rearward, to generate a set of data representing photometric characteristics of each checked marker light, is particularly advantageous.

However, it is also possible to implement a rod having a set of frontward photometrical sensors and a set of rearward photometrical sensors to check two-way marker lights in a single passage with a different data processing and transmission technology.

Figure 1:
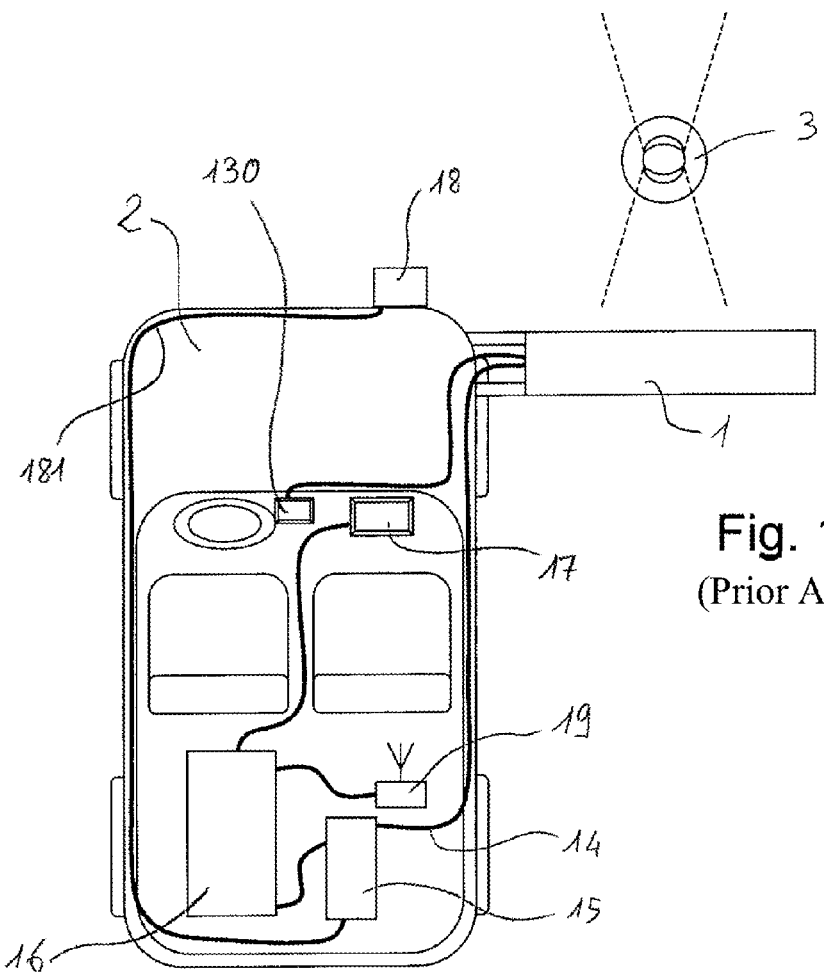
Figure 2:
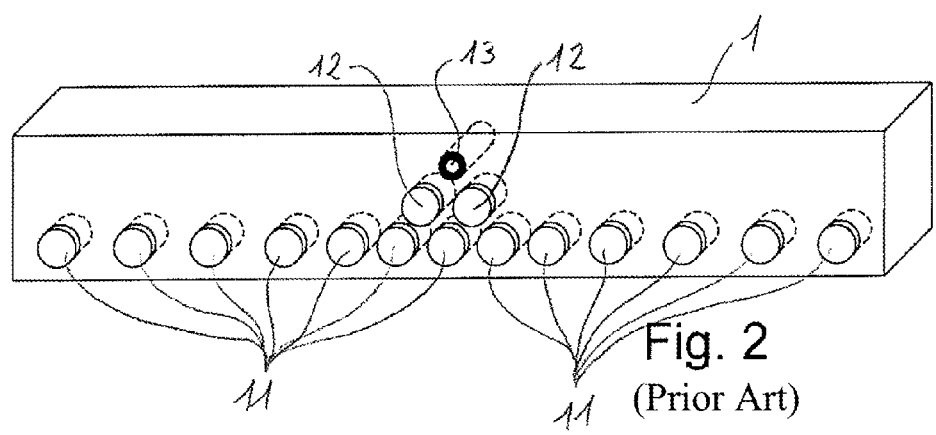

A mobile checking apparatus comprising such a rod can for example implement a data processing and transmission technology similar to that implemented in the prior art rod 1 shown in FIG. 1, in which the different sensors are connected to a computer situated in the vehicle, or any other technology known to those skilled in the art. This data transmission technology is indeed independent of the advantage provided by the rod having photometrical sensors on its front and rear faces, thus making it possible to reduce the number of passages of the vehicle on the runway.

An exemplary embodiment of the present disclosure provides a mobile apparatus for checking marker lights, the installation of which in a vehicle is easier, faster and more reliable than in the prior art.

An embodiment provides a mobile apparatus of this kind that, according to certain embodiments, is less sensitive to electromagnetic disturbances.

An embodiment provides a mobile apparatus such as this that enables faster checking of the marker lights in order to limit the time during which the runways are not used.

An embodiment provides a mobile checking apparatus of this kind that occupies less space, is more reliable and more efficient than the apparatuses of the prior art.

Although the present disclosure has been described with reference to one or more examples, workers skilled in the art will recognize that changes may be made in form and detail without departing from the scope of the disclosure and/or the appended claims.

The invention claimed is:

1. A mobile apparatus for measuring photometric characteristics of airport marker lights, the mobile apparatus comprising:
a measuring rod configured to be moved above the marker lights to be checked, in the light beams emitted by these marker lights, and
means for measuring a distance between said measuring rod and the marker lights to be checked, said measuring rod carrying at least one photometric sensor,
wherein said measuring rod comprises means for acquiring and processing signals emitted by said at least one photometric sensor during its movement, as a function of the distance measured between said measuring rod and the marker lights to be checked, said means for acquiring and processing being configured for generating a set of data representing photometric characteristics of each marker light checked.

2. The mobile measurement apparatus according to claim 1, wherein said measuring rod constitutes a Faraday cage protecting said sensors and/or said means for acquiring and processing against electromagnetic radiation.

3. The mobile measurement apparatus according to claim 1, wherein said set of data representing the photometric characteristics of each checked marker light is a digital signal.

4. The mobile measurement apparatus according to claim 1, wherein said measuring rod carries means for transmitting said set of data to a computer enabling recording of said sets of data and/or to an interface with a user.

5. The mobile measurement apparatus according to claim 4, wherein said means for transmitting comprise means for radio transmission.

6. The mobile measurement apparatus according to claim 5, wherein said means for radio transmission are constituted by a radio transmitter complying with a WiFi standard.

7. The mobile measurement apparatus according to claim 1, wherein said measuring rod comprises a plurality of frontward-oriented photometric sensors.

8. The mobile measurement apparatus according to claim 7, wherein said measuring rod furthermore comprises a plurality of rearward-oriented photometric sensors.

9. The mobile measurement apparatus according to claim 1, wherein said measuring rod comprises at least one photometric sensor configured to detect downward-oriented marker lights.

10. The mobile apparatus according to claim 9, wherein said means for measuring the distance between said measuring rod and the lights to be checked include said photometric sensor for detecting marker lights and means for measuring a speed of movement of said measuring rod.

11. The mobile measurement apparatus according to claim 1, wherein said measuring rod comprises means for colorimetric analysis of the marker lights checked.

12. The mobile measurement apparatus according to claim 1, wherein said means for processing are constituted by an industrial programmable automaton placed in said measuring rod.

13. The mobile measurement apparatus according to claim 1, wherein the apparatus comprises a geolocation receiver enabling each set of data representing the photometric characteristics of a marker light to be associated with the geolocation coordinates of this marker light.

14. A mobile apparatus for measuring photometric characteristics of airport marker lights, the mobile apparatus comprising:
- a measuring rod configured to be moved above the marker lights to be checked, in light beams emitted by these marker lights,
- a measuring device configured to measure a distance between said measuring rod and the marker lights to be checked;
- at least one photometric sensor carried by the measuring rod; and
- an automation device, comprised by the measuring rod, which is programmed to acquire and process signals emitted by said at least one photometric sensor during movement of the measuring rod, as a function of the distance measured between said measuring rod and the marker lights to be checked, said automation device being configured to generate a set of data representing photometric characteristics of each marker light checked.

* * * * *